(12) United States Patent
Missotten et al.

(10) Patent No.: US 10,292,323 B2
(45) Date of Patent: May 21, 2019

(54) MANAGING A COMBINE RESIDUE SYSTEM USING FIELD-DATA

(71) Applicant: CNH Industrial America LLC, New Holland, PA (US)

(72) Inventors: Bart M. A. Missotten, Herent (BE); Dré W. J. Jongmans, AG Klundert (NL); Frederik Tallir, Esen (BE); Thomas Mahieu, Ypres (BE)

(73) Assignee: CNH Industrial America LLC, New Holland, PA (US)

(*) Notice: Subject to any disclaimer, the term of this patent is extended or adjusted under 35 U.S.C. 154(b) by 162 days.

(21) Appl. No.: 15/422,172

(22) Filed: Feb. 1, 2017

(65) Prior Publication Data

US 2017/0215330 A1    Aug. 3, 2017

(30) Foreign Application Priority Data

Feb. 1, 2016   (BE) .................................. 2016/5078

(51) Int. Cl.
| | | |
|---|---|---|
| *G05D 1/02* | (2006.01) | |
| *A01B 79/00* | (2006.01) | |
| *A01D 41/12* | (2006.01) | |
| *A01D 41/127* | (2006.01) | |

(52) U.S. Cl.
CPC .......... *A01B 79/005* (2013.01); *A01D 41/127* (2013.01); *A01D 41/1243* (2013.01); *G05D 1/0219* (2013.01); *G05D 1/0278* (2013.01); *G05D 2201/0201* (2013.01)

(58) Field of Classification Search
None
See application file for complete search history.

(56) References Cited

U.S. PATENT DOCUMENTS

| | | | |
|---|---|---|---|
| 5,754,137 A | 5/1998 | Dürrstein | |
| 5,995,895 A * | 11/1999 | Watt ..................... | A01B 79/005 56/10.2 G |
| 2010/0036696 A1* | 2/2010 | Lang .................... | A01B 79/005 705/7.39 |
| 2014/0215984 A1* | 8/2014 | Bischoff ................ | A01D 75/00 56/10.2 R |
| 2014/0249893 A1* | 9/2014 | McClure .............. | G09B 29/007 705/7.39 |
| 2015/0105984 A1 | 4/2015 | Birrell et al. | |

FOREIGN PATENT DOCUMENTS

| | | |
|---|---|---|
| EP | 0702891 A1 | 3/1996 |
| EP | 2382853 A2 | 11/2011 |
| EP | 2798944 A2 | 11/2014 |

* cited by examiner

*Primary Examiner* — Rami Khatib
(74) *Attorney, Agent, or Firm* — Peter K. Zacharias; Patrick M. Sheldrake

(57) ABSTRACT

A method for operating an agricultural combine in a field using at least one field-map. The method includes steps of determining (S1) a position of the agricultural combine in the field, retrieving (S2) field-related data from the at least one field-map related to the determined position in the field, and adjusting (S3) residue processing system settings of the agricultural combine based on the retrieved data.

13 Claims, 2 Drawing Sheets

MANAGING A COMBINE RESIDUE SYSTEM USING FIELD-DATA

CROSS REFERENCE TO RELATED APPLICATION

This application claims priority to Belgium Patent Application No. 2016/5078 filed Feb. 1, 2016, the contents of which are incorporated herein by reference.

FIELD OF THE INVENTION

The present invention relates to a method for operating an agricultural combine on a field. Particularly, the present invention relates to an improved method for operating an agricultural combine using field data which is comprised for example in a field-map.

BACKGROUND OF THE INVENTION

Field-maps are collections of data relating to a field and wherein particularly data is provided for each of multiple segments of the field. Thereby, the data is typically collected over a period of time, for example over several years, and comprises all sorts of information such as weather related information, soil related information, information relating to historic processing of the field, information on previously harvested crops, information on the yields of previously harvested crops, slope information and any other field related information. Thereby, it will be clear that the field related information can directly relate or indirectly relate to the field. Furthermore, the data can be collected in many ways. One example is collection of data via weather stations, via satellite monitoring of the field, via drone or airplane monitoring of the field, by collecting data when the field is processed with an agricultural vehicle, or by manual testing of aspects relating to the field. Thereby, data is preferably periodically collected, for example once a week.

Although the above information is collected for several years, and is available to the farmer, most farmers lack the tools to use this information for their benefit.

It is an object of the present invention to provide a method for operating an agricultural combine wherein the field-map information can be used to optimize the operating method.

SUMMARY OF THE INVENTION

To this end, the invention provides a method of operating an agricultural combine on a field using at least one field-map, wherein the method comprises:

determining a position of the agricultural combine on the field;

retrieving field related data from the at least one field-map related to the determined position on the field;

adjusting residue processing system settings of the agricultural combine based on the retrieved data.

The method is based on the insight that changing residue processing system settings influences field conditions. With this knowledge, specific field conditions, retrieved from the field related data, can be linked to corresponding residue processing system settings. This allows, based on field related data retrieved from field-maps, to adapt the residue processing system settings thereby obtaining an optimal effect on the field for the particular field section. In this manner, residue can be optimally used to improve the field, taking specific field requirements into account.

Preferably the residue processing system settings comprise chopper settings to influence the average particle size of residue processed by the residue processing system. Further preferably, the chopper settings relate to the chopper speed settings so that increasing the chopper speed decreases the average particle size of residue processed by the residue processing system. The mechanical treatment of the straw by chopping starts the composting of the straw. This composting process can be stimulated by adapting the chop length. Thereby, adjusting the chopper settings influences the composting process. Long chops of straw tend to give another bacterial environment compared to short chops. Short chops create a more dense tarp over the soil so that less moister evaporates. This stimulates the adding of phosphate and/or nutrition into the ground via the bacterial process.

Preferably the residue processing system settings comprise distribution settings to influence the distribution of the residue expelled by the residue processing system. By adapting the distribution settings, the amount of residue that is expelled onto each segment of the ground can be regulated. Particularly on sloped parts of the field, the distribution settings can be adjusted to distribute a majority of the residue onto a more flat part of the field while distributing less residue onto a field part with a high slope.

Preferably the field related data comprises yield data related to the yield of multiple field segments of the field over a predetermined time period. Thereby, preferably the yield data comprises crop development data collected over the period of time for the multiple field segments. Further preferably, the yield data comprises historic manuring data so that the influence of the manuring in combination with the yield data provides an indication for the revenue potential of the field segments. Information on yield data, preferably on revenue potential of field segments, allows the farmer to optimize the use of residue, wherein the majority of the residue is used for segments of the field with the highest revenue potential. Also, further taking into account the above described effects of the chopping, the chopper settings can be adjusted to optimally maximize the revenue on each field segment.

Preferably the field related data comprises slope data related to the slope of multiple field segments of the field. As explained above, the slope data can be used to adjust the residue processing system settings.

The invention further relates to an agricultural combine comprising a positioning system adapted for determining a position of the combine on a field, comprising a residue processing system adapted for processing and expelling residue onto the field based on residue processing system settings, and comprising a controller operationally coupled to a memory wherein field related data is stored in at least one field-map, wherein the controller is further operationally coupled to the positioning system and to the residue processing system and wherein the controller is configured to generate and adjust residue processing system settings based field related data retrieved from the memory corresponding to the determined position on the field. The agricultural combine according to the invention provides all elements to execute the above described method of the invention. The effects and advantages which are described above in relation to the method of the invention therefore equally apply to the agricultural combine of the invention.

Preferably the residue processing system comprises a chopper and wherein said residue processing system settings comprise chopper settings to influence the average particle size of the residue expelled by the residue processing system. Further preferably, the controller is adapted to steer distribution settings to influence the distribution of the residue expelled by the residue processing system over the field.

BRIEF DESCRIPTION OF THE DRAWINGS

Some embodiments of apparatus and/or methods in accordance with embodiments of the present invention are now described, by way of example only, and with reference to the accompanying drawings, in which.

DETAILED DESCRIPTION OF THE DRAWINGS

Figure 1:
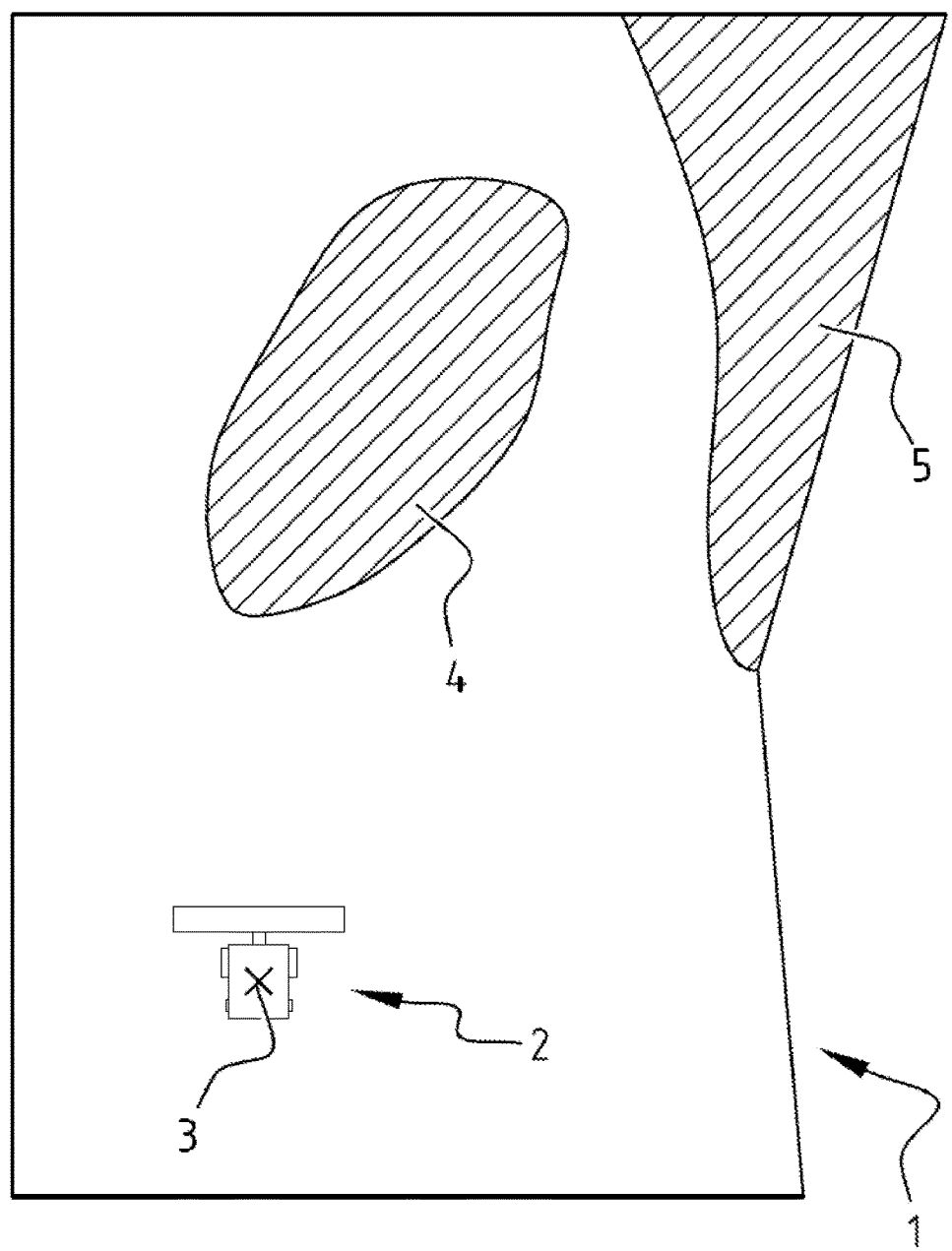
FIG. 1 illustrates a field with field segments having deviating properties and an agricultural combine driving on the field.

FIG. 1 illustrates a top view of a field 1, and shows an agricultural combine 2 in a working position on the field. When harvesting a field 1 with an agricultural combine 2, the agricultural combine 2 typically drives along a path over the field so that the complete field 1 is harvested by the agricultural combine 2. While driving over the path, the agricultural combine 2 passes over a plurality of individual positions over the field or segments of the field. Each of these positions or segments have characteristics, also referred to as field related characteristics. Characteristics can relate to physical soil conditions. For example, a part of the field might be known to contain rocks in the soil affecting the yield of that part of the field 1. Characteristics can also relate to tilt or slope conditions; for example a first segment of the field can show a tilt while another segment of the field is substantially horizontal and flat. Characteristics can also relate to previous crops that have been planted on the field, having an influence on the soil depletion. Characteristics can further relate to manuring operations that have been conducted on the field. Characteristics can also relate to historic events that have an influence on the soil conditions, for example weather events such as rain, snow, hail and their respective amounts. Characteristics can also be measured real-time during operation of the combine, for example by measuring the density of the harvest. To this end, the combine could be equipped with a crop density scanner, at the front of the combine, measuring the density of the crop which is harvested. These examples of characteristics are not listed as an exhaustive list, but are intended as mere examples of many elements that have an effect on the yield and optimal processing operations on a field.

Field related characteristics are collected in so-called field maps. FIG. 1 shows a simple example of such field map 1. In FIG. 1, two zones 4, 5 are defined on the field map 1. These zones 4, 5 can be assigned to one or multiple field characteristics. For example, the first zone 4 can indicate a segment of the field where many stones or rocks are present in the soil, so that the maximum yield of this segment of the field is lower due to the stones or rocks. The second zone 5 can indicate for example a sloped part of the field.

The agricultural combine 2 is provided to determine its position 3 on the field 1. This position 3 can be determined directly by the combine 2 based for example on GPS coordinates and a field map loaded into a memory of the agricultural combine 2. The position 3 can also be determined indirectly or externally by an external server receiving position data relating to the combine, and matching this position data with one or more field maps to determine the position of the combine of the field. In the latter situation, the combine 2 does not determine its position itself, and might not even have direct knowledge of its position on the field, but the position is known externally, for example on a server. As will be discussed further, the agricultural combine will be configured to adapt residue processing system settings based on the position on the field. The skilled person will understand, based on the explanation above, that the agricultural combine can receive residue processing system settings from an external server who calculates these settings based on the position of the agricultural combine on the field and the corresponding field maps. In another example, the agricultural combine 1 comprises a controller and a memory, and is configured to calculate the residue processing system settings itself based on its known position and based on the field maps in the memory of the combine 2. Other hybrid configurations are also possible wherein a part of the calculations is conducted at the agricultural combine 2 and another part remotely.

Figure 2:
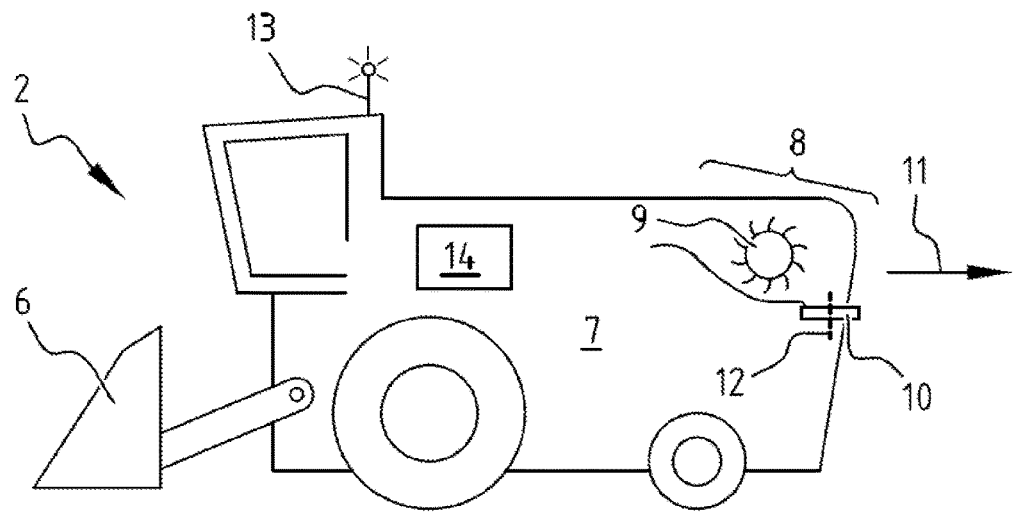
FIG. 2 illustrates an agricultural combine and shows elements of the residue processing system.

FIG. 2 illustrates an agricultural combine, and shows a side view of a combine 2 wherein the residue processing system 8 is shown in cross section to show the main elements of the residue processing system 8. The agricultural combine comprises a header 6 connected to a body 7. The back end of the body is provided with a residue processing system 8. In operation, when the agricultural combine 2 is driven over the field 1, the header 6 cuts the crop material from the field and draws the crop material into the body 7 of the agricultural combine 2. In the body 7, the harvest or crop is separated from the residue. The residue is expelled back onto the field, as illustrated with arrow 11, by the residue processing system 8.

The residue processing system 8 is adapted to distribute residue on the field. The distribution of the residue on the field is adaptable by steering the residue processing system 8. Residue processing systems 8 according to the prior art can be steered to influence the residue distribution, for example to compensate for external influences such as wind, so that an even distribution can be obtained in multiple circumstances. Particularly, the force/speed with which the residue processing system 8 throws the residue out of the agricultural combine 2 can be adjusted. Furthermore, the angular range over which the residue processing system 8 spreads the residue can also be adjusted. Thereby, the residue processing system 8 typically comprises multiple (at least a left and a right) spreaders 10 for throwing the residue out of the back end of the combine 2, the speed of which spreaders are adjustable. This allows to change distribution of the residue over the field by adapting the residue processing system 8, particularly the speed of the spreaders. Since these spreaders 10 are known in the prior art no further specifications are given regarding this residue processing system since the skilled person knows these systems and will know how such systems can be steered to adapt the residue distribution.

The residue processing system 8 typically comprises a chopper 9 for chopping the residue into residue particles. The speed of the chopper 9 influences the particle size of the chopped residue. By increasing the chopper speed 9, the particle size decreases and expelling the residue particles on the field will result in a more dense layer of residue.

Residue spreader system settings are not limited to chopper speed and distribution, but can comprise amount, length or aggressiveness of chopping which is adaptable for example by inserting shred bars or by changing the position of the shred bars and/or the knives to influence the chopping result. Alternatively, obstacles can be placed in the material flow in the chopper causing a more intense chopping.

The invention is based on the insight that field conditions can be improved by adapting the residue processing system 8 settings based on field characteristics. Examples of such adaptations to the settings of the residue processing system 8 that have a positive effect on the field 1 are described hereunder in multiple embodiments. Each of these embodiments can be implemented as a stand-alone embodiment, or can be combined with other of the multiple embodiments.

In a first embodiment, the chopper 9 speed is adapted based on field characteristics. These field characteristics are retrieved from field maps which are described above. By adapting the speed, particularly the rotation speed of the chopper 9, the particle size of the residue particles that are expelled 11 onto the field can be adapted. This creates not only a less dense or more dense layer on the soil, but also has an effect on the moisture content that can be contained by the layer in certain environmental conditions, and has an effect on the composting speed. Particularly, the composting speed influences the bacterial environment which has a direct influence on the manuring speed and intensity of the field as a result of the layer of residue. For example, a field segment for which the field map indicates that extra manuring might improve the yield, the rotations speed of the chopper 9 might be increased. This has as an effect that the composting process is also increased, so that the soil receives more nutrition in a shorter time period, after which an extra manuring or fertilizing operation can be conducted on that segment. For another segment of the field, extra manuring might not improve the yield of the field 1, so that the chopper speed is decreased, thereby increasing the time period over which the composting process takes place. In this manner, an optimal yield can be obtained for each field segment by adjusting the speed of the chopper 9 of the residue processing system 8.

According to a further embodiment, the spreading mechanism 10 is adjusted to adjust the distribution of the residue over the field. Historically, attempts have always aimed at obtaining a distribution which is as even as possible to cover the field with residue as evenly as possible. Depending on the specific field characteristics, an even distribution might not be optimal. For example, when a segment of the field is known to contain rocks in the soil, it might be more optimal to distribute a majority of residue particles onto an adjacent segment of the field, without rocks in the soil, so that the positive effect of composting the residue can be shifted towards a segment of the field with a significantly higher yield potential. The idea behind this adjustment is that the positive effect of composting is significantly less in the field segments containing the rocks than in the field segments without the rocks in the soil. Therefore, the residue can be more optimally used in field segments without rocks, so that an uneven distribution, based on the field maps, improves the field conditions compared to a situation wherein the residue is evenly distributed. Other examples where an uneven distribution might be preferred over an even distribution relates to slopes. Particularly when an agricultural combine is driven over a partly sloped field segment, it might be advantageous to distribute the majority of the residue particles onto an even part of the field while only a minority is distributed on the sloped part of the field, so that the residue suffers less from rinsing effects.

According to yet another embodiment, the chopper speed is decreased on slopes so that the residue particles size is larger which results in a more stable layer of residue.

In another embodiment, the combine measures the crop density while operating using for example a crop density scanner at the front of the combine. This data could be used to adjust the chopper settings to chop more intensively/less intensively on high/low yielding spots respectively. In such situation, the combine is adapted to adjust the residue system settings fast enough to react to what is in front of the header. This can be implemented in a closed loop system or via an operator assistance system suggesting the operator which action to take on the residue system.

In FIG. 2, the spreaders 10 embodying the distribution mechanism are illustrated as a disc 10 adapted to rotate around an axis 12. Thereby, typically a left and a right disc 10 are provided. Distribution can be easily adapted by changing the rotation speed of at least one of the two discs 10.

The position of the agricultural combine 2 is determined via a known positioning system, such as GPS. To this end, an antenna 13 can be provided at the agricultural combine 2 to operationally connect with the positioning system. The agricultural combine further comprises a controller 14 for determining directly or indirectly the residue processing system settings. As described above, residue processing system 8 settings can be directly obtained by calculation of the settings by the controller 14 based on field maps stored in a memory of the combine 2. The controller 14 can indirectly obtain the settings by communicating with an external server where the settings are calculated. Hybrid systems wherein a part of the calculations is executed remotely can also be designed.

Figure 3:
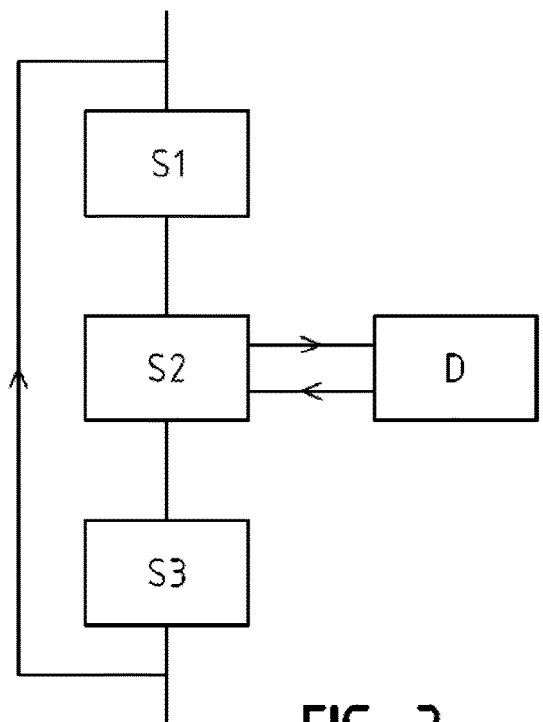
FIG. 3 shows a flowchart of the method of an embodiment of the invention.

FIG. 3 illustrates the steps of the method for determining the settings of the residue processing system 8. In step S1, the position 3 of the combine 2 on the field 1 is retrieved. In step S2, the retrieved position is used to determine field data or field characteristics from a data set D, based on which settings for the residue processing system 8 are calculated. As described above, this step S2 could be performed partly or completely remote from the agricultural combine 2. In step S3, the residue processing system 8 is controlled using the settings calculated in step S2. These steps S1, S2 and S3 are repeated periodically to adapt the residue processing systems based on the location of the field and the corresponding field data.

Based on the figures and the description, the skilled person will be able to understand the operation and advantages of the invention as well as different embodiments thereof. It is however noted that the description and figures are merely intended for understanding the invention, and not for limiting the invention to certain embodiments or examples used therein. Therefore it is emphasized that the scope of the invention will only be defined in the claims.

What is claimed is:

1. A method of operating an agricultural combine on a field using at least one field-map, the method comprising steps of:

providing the agricultural combine including a positioning system, a residue processing system comprising a chopper, the residue processing system is configured for processing and expelling residue onto the field based on residue processing system settings, the residue processing system settings comprising chopper settings to influence an average particle size of residue expelled by the residue processing system, a controller, and a memory in which field-related data is stored in the at least one field-map, the controller being operationally coupled to the memory, the positioning system, and the residue processing system;

determining, by the positioning system, a position of the agricultural combine in the field;
retrieving, by the memory, the field-related data from the at least one field-map related to the determined position in the field; and
adjusting the residue processing system settings, by the controller, based on the retrieved field-related data such that the controller adjusts the chopper to one of decrease the average particle size of the residue to deposit a layer of residue with a first density and increase the average particle size of the residue to deposit another layer of residue with a second density that is less than the first density.

2. The method according to claim 1, wherein the chopper settings are chopper speed settings.

3. The method according to claim 1, wherein the settings of the residue processing system comprise distribution settings to influence a distribution of residue expelled by the residue processing system.

4. The method according to claim 3, wherein the distribution settings comprise spreader speed settings.

5. The method according to claim 1, wherein the field-related data comprises yield data related to a yield of multiple field segments of the field over a predetermined period of time.

6. The method according to claim 5, wherein the yield data comprises crop development data collected over a period of time for the multiple field segments.

7. The method according to claim 5, wherein the yield data comprises historic manuring data so that an influence of the manuring in combination with the yield data provides an indication for revenue potential.

8. The method according to claim 1, wherein the field-related data comprises slope data related to slopes of multiple field segments of the field.

9. The method according to claim 8, wherein the settings of the residue processing system comprise distribution settings to influence a distribution of residue expelled by the residue processing system, and the method includes a step of unevenly distributing residue by adjusting the distribution settings, by the controller, so that the residue processing system distributes a majority of the residue onto a more flat part of the field and distributes less residue onto a field part with a high slope.

10. The method according to claim 1, wherein the least one field-map includes a first field segment in which a plurality of rocks are present and a second field segment that is adjacent to the first field segment, and the settings of the residue processing system comprise distribution settings to influence a distribution of residue expelled by the residue processing system, and the method includes a step of unevenly distributing residue by adjusting the distribution settings, by the controller, so that that the residue processing system unevenly distributes a majority of residue onto the second field segment and less residue onto the first field segment.

11. An agricultural combine comprising:
a positioning system adapted for determining a position of the combine in a field;
a residue processing system comprising a chopper and being adapted for processing and expelling residue onto the field based on residue processing system settings, and the residue processing system settings comprise chopper settings to influence an average particle size of the residue expelled by the residue processing system; and
a controller operationally coupled to:
a memory wherein field-related data is stored in at least one field-map;
the positioning system; and
the residue processing system,
wherein the controller is configured to generate and adjust residue processing system settings based on the field-related data retrieved from the memory corresponding to the determined position in the field such that the controller adjusts the chopper to one of decrease the average particle size of the residue to deposit a layer of residue with a first density and increase the average particle size of the residue to deposit another layer of residue with a second density that is less than the first density.

12. The agricultural combine according to claim 11, wherein the least one field-map includes a first field segment in which a plurality of rocks are present and a second field segment that is adjacent to the first field segment, and the settings of the residue processing system comprise distribution settings to influence a distribution of residue expelled by the residue processing system, and the controller adjusts the distribution settings so that the residue processing system unevenly distributes a majority of residue onto the second field segment and less residue onto the first field segment.

13. The agricultural combine according to claim 11, wherein the settings of the residue processing system comprise distribution settings to influence a distribution of residue expelled by the residue processing system, and the field-related data comprises slope data related to slopes of multiple field segments of the field, and the controller adjusts the distribution settings so that the residue processing system distributes a majority of the residue onto a more flat part of the field while distributing less residue onto a field part with a high slope.

* * * * *